United States Patent

Nakao

(10) Patent No.: US 10,104,155 B2
(45) Date of Patent: Oct. 16, 2018

(54) DOCUMENT PROVIDING SYSTEM, PROVIDING-SIDE APPARATUS, AND DISPLAY-SIDE APPARATUS

(71) Applicant: THE UNIVERSITY OF TOKYO, Tokyo (JP)

(72) Inventor: Akihiro Nakao, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 411 days.

(21) Appl. No.: 14/657,782

(22) Filed: Mar. 13, 2015

(65) Prior Publication Data

US 2015/0264110 A1 Sep. 17, 2015

(30) Foreign Application Priority Data

Mar. 14, 2014 (JP) ................................. 2014-052812

(51) Int. Cl.
*G06F 15/16* (2006.01)
*H04L 29/08* (2006.01)
*H04L 29/06* (2006.01)

(52) U.S. Cl.
CPC .......... *H04L 67/06* (2013.01); *H04L 65/4076* (2013.01)

(58) Field of Classification Search
CPC ........................... H04L 67/06; H04L 65/4076
See application file for complete search history.

(56) References Cited

U.S. PATENT DOCUMENTS

| | | | | |
|---|---|---|---|---|
| 8,307,300 B1* | 11/2012 | Fisher | ..................... | G06F 9/542 345/531 |
| 2006/0080535 A1* | 4/2006 | Elazar | ..................... | G06F 21/10 713/176 |
| 2009/0271713 A1* | 10/2009 | Stull | ..................... | G06Q 10/10 715/753 |
| 2010/0229086 A1* | 9/2010 | Howell | ............... | G06F 17/2205 715/273 |
| 2012/0070090 A1* | 3/2012 | Chang | ..................... | G06K 9/00 382/218 |
| 2012/0166679 A1* | 6/2012 | Zawacki | ............... | G06F 13/385 710/8 |
| 2013/0063490 A1* | 3/2013 | Zaman | ............... | G06F 3/04883 345/649 |
| 2014/0114920 A1* | 4/2014 | Zhang | ..................... | H04L 67/06 707/634 |
| 2014/0244736 A1* | 8/2014 | Oikonomidis | ........ | H04W 4/206 709/204 |
| 2014/0359637 A1* | 12/2014 | Yan | ....................... | G06F 9/4881 718/108 |
| 2015/0033104 A1* | 1/2015 | Zhang | ............... | G06F 17/30873 715/205 |

FOREIGN PATENT DOCUMENTS

JP 2013-211675 A 10/2013

* cited by examiner

*Primary Examiner* — Jonathan A Bui

(57) ABSTRACT

Provided is a document providing system, a providing-side apparatus, and a display-side apparatus, capable of increasing the usability. The providing-side apparatus 1 broadcasts the designated information for specifying the designated document. The display-side apparatus 2 holds the documents to be provided, and upon receiving the broadcasted document specifying information, the display-side apparatus 2 searches the held documents to retrieve a document specified by the received information, and displays the retrieved document.

3 Claims, 7 Drawing Sheets

| Document | Document Specifying Information |
|---|---|
|  | aaaaa ··· |
|  | bbbbb ··· |
| ⋮ | ⋮ |

DOCUMENT PROVIDING SYSTEM, PROVIDING-SIDE APPARATUS, AND DISPLAY-SIDE APPARATUS

CROSS-REFERENCES TO RELATED APPLICATION

This application claims priority from Japanese Patent Application Serial No. 2014-052812 filed Mar. 14, 2015, the contents of which are incorporated herein by reference in its entirety.

TECHNICAL FIELD

The present disclosure relates to a document providing system, a providing-side apparatus, and a display-side apparatus.

BACKGROUND ART

Recently, a presentation software is widely used in a lecture, meeting, etc. Specifically, a user selects a slide which should be displayed using presentation software, and shows the selected slide on a projector, etc.

However, when a meeting room is large or some participants are located at a remote place, showing on a projector sufficiently clear for all participants may sometimes be difficult.

Japanese Unexamined Patent Publication (Kokai) No. 2013-211675 discloses a technology by which participants of a meeting share a material, and can refer to the same portion. According to the technology disclosed in Patent Document 1, one terminal functions as a master terminal, and when a page of the material or a display magnification is changed on the master terminal, the changed state is reflected on the material display of a slave terminal.

The above prior art has drawbacks that complicate setting is required at the time of participating a meeting, resulting in the low usability.

SUMMARY

The present disclosure has been thought of, in view of the above drawbacks. One of the objectives of the present disclosure is to provide a document providing system, a providing-side apparatus, and a display-side apparatus, capable of increasing the usability.

In order to solve the above drawbacks of the prior arts, the present disclosure provides a document providing system comprising a providing-side apparatus and a display-side apparatus; wherein, the providing-side apparatus comprises, a holding device which holds documents to be provided, and a broadcast device which broadcasts information specifying a document designated among the held documents; and the display-side apparatus comprises, a holding device which holds documents which can be provided, a receiving device which receives the broadcasted document specifying information, a retrieval device which retrieves a document specified by the received information, from among the documents held by the holding device, and a display device which displays the retrieved document.

BRIEF DESCRIPTION OF DRAWINGS

Reference will now be made in detail to the present preferred embodiments of the present invention, examples of which are illustrated in accompanying drawings.

DESCRIPTION

Figure 1:
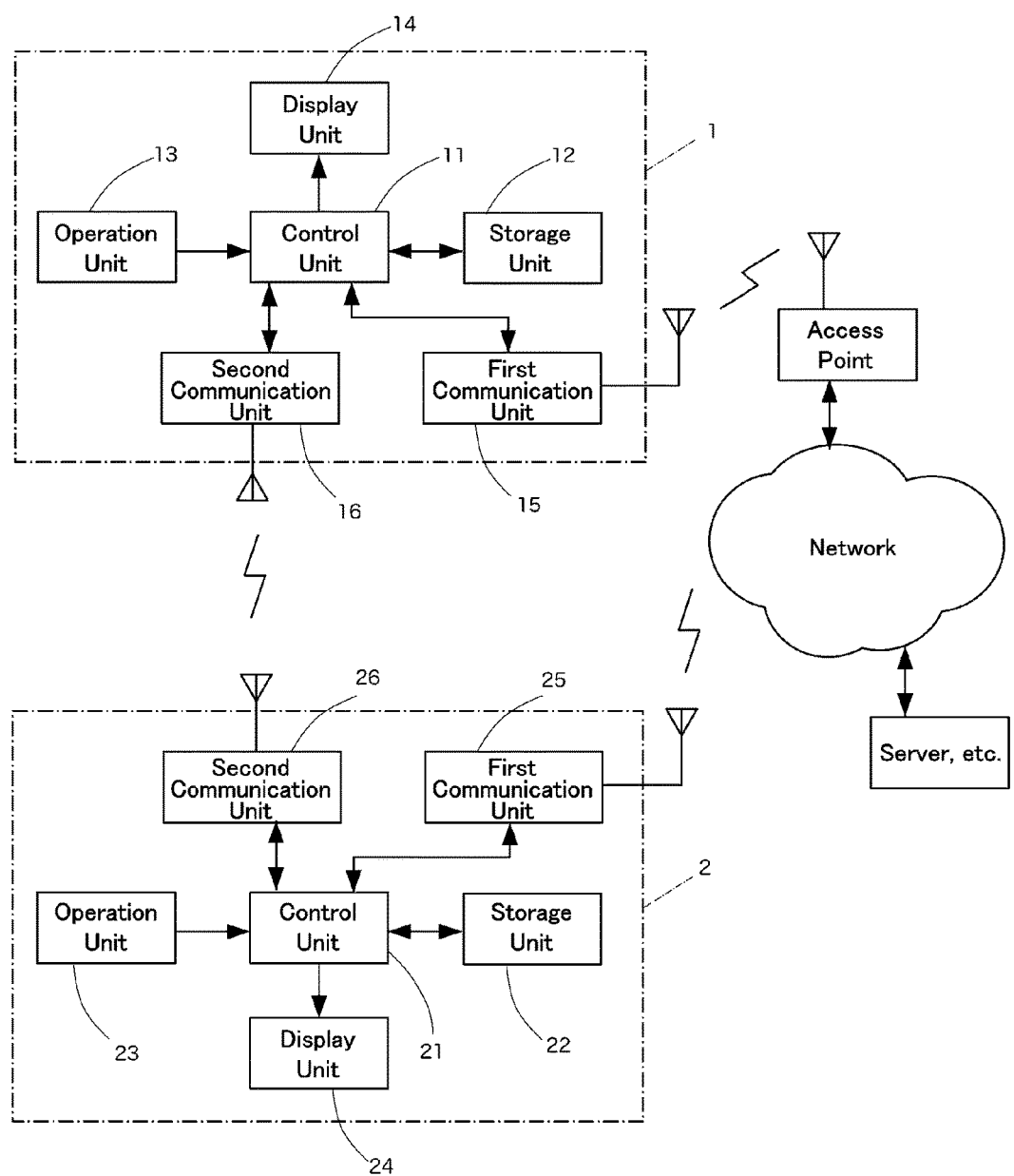
FIG. 1 is a structural block diagram showing an example of a document providing system according to an embodiment of the present disclosure.

An embodiment of the present disclosure will be explained with reference to the drawings. As exemplified in FIG. 1, according to an embodiment of the present disclosure, a document providing system comprises a providing-side apparatus 1, and a display-side apparatus 2. The providing-side apparatus 1 comprises a control unit 11, a storage unit 12, an operation unit 13, a display unit 14, a first communication unit 15, and a second communication unit 16. The display-side apparatus 2 comprises a control unit 21, a storage unit 22, an operation unit 23, a display unit 24, a first communication unit 25, and a second communication unit 26.

The control unit 11 is a program controlled device such as a CPU, and operates in accordance with a program stored in the storage unit 12. According to an example of the present embodiment, the control unit 11 holds documents to be provided, in the storage unit 12. Also, the control unit 11 receives designation of anyone of the held documents, from a user. Then, the control unit 11 broadcasts information which specifies the designated document, through the second communication unit 16. Here, broadcasting refers to the transmission of information in a way that the information can be received by anyone having the ability of receiving the information, without the designation of destination. The operations of the control unit 11 will be described in detail below.

The storage unit 12 is a memory device, etc., and holds a program to be executed by the control unit 11. The storage unit 12 stores documents to be provided. According to an example of the present embodiment, the document is stored by being divided per predetermined unit, such as per page, per slide, etc. The storage unit 12 also functions as a work memory of the control unit 11. According to an example of the present embodiment, the program to be executed by the control unit 11 may be provided in a non-transitory computer readable recording medium such as a DVD-ROM, etc., and stored in the storage unit 12. Further, the program may be delivered through a network, and stored in the storage unit 12.

The operation unit 13 is a keyboard, a mouse, a touch panel, etc., which receives a user's instruction operation, and outputs the content of the instruction operation to the control unit 11. The display unit 14 is a LCD display, etc., which displays information in accordance with the instruction input from the control unit 11.

The first communication unit 15 is a network interface such as a wired LAN interface, a Wi-Fi interface, etc., which transmits information through a network in accordance with the instruction input from the control unit 11. The first communication unit 15 also outputs information, received through the network, to the control unit 11.

The second communication unit 16 is an interface usually referred to as a near-field communication interface such as Bluetooth (registered trademark), etc., which transmits information in accordance with instruction input from the control unit 11. The second communication unit 16 receives signals transmitted in accordance with a corresponding protocol, and outputs information expressed by the received signals, to the control unit 11.

The control unit 21 of the display-side apparatus 2 is also a program controlled device such as a CPU, and operates in accordance with a program stored in the storage unit 22. According to the present embodiment, the control unit 21 downloads a document which can be provided by the providing-side apparatus, through, for example, the first communication unit 15, from a server device, etc., on the network, and stores the downloaded document in the storage unit 22. The control unit 21 also receives document specifying information which is broadcasted by the providing-side apparatus 1 through the second communication unit 16. The control unit 21 searches the documents stored in storage unit 22 to find out a document specified by the received information, and when the relevant document is retrieved, the control unit 21 displays the retrieved document. These operations of the control unit 21 will be described in detail below.

The storage unit 22 is a memory device, etc., and holds a program to be executed by the control unit 21. The storage unit 22 stores documents which can be provided. According to an example of the present embodiment, the document is stored by being divided per predetermined unit, such as per page, per slide, etc. The storage unit 22 also functions as a work memory of the control unit 21. According to an example of the present embodiment, the program to be executed by the control unit 21 may be provided in a non-transitory computer readable recording medium such as a DVD-ROM, etc., and stored in the storage unit 22. Further, the program may be delivered through a network, and stored in the storage unit 22.

The operation unit 23 is a keyboard, a mouse, a touch panel, etc., which receives a user's instruction operation, and outputs the content of the instruction operation to the control unit 21. The display unit 24 is a display, etc., which displays information (a document, etc.) in accordance with the instruction input from the control unit 21.

The first communication unit 25 is a network interface such as a wired LAN interface, a Wi-Fi interface, etc., which transmits information through a network in accordance with the instruction input from the control unit 21. The first communication unit 25 also outputs the information received through the network, to the control unit 21.

The second communication unit 26 is an interface usually referred to as a near-field communication interface such as Bluetooth (registered trademark), etc., which transmits information in accordance with the instruction input from the control unit 21. The second communication unit 26 receives signals transmitted in accordance with a corresponding protocol, and outputs information expressed by the received signals to the control unit 21.

Operations of the control unit 11 of the providing-side apparatus 1 according to the present embodiment will be explained. In the following explanation of the present embodiment, the control unit 11 obtains a document to be stored in the storage unit 12, as follows. Namely, the control unit 11 acquires information such as a plurality of pages of data in PDF format (which is defined by Adobe Systems Incorporated), and the information defines the original of the document (referred to as document original information). The control unit 11 renders each page data of the acquired document original information into a bitmap image of a predetermined format, such as a predetermined sized PNG, etc., and stores the rendered image in the storage unit 12 as a document. The present embodiment is not limited thereto. For example, the document original information may be a plurality of pages (slides) of data created by using a presentation software such as Microsoft PowerPoint (registered trademark), etc. The page data which is to become a document to be processed may be rendered into not only PNG, but also into other bitmap image format of a static image or a dynamic image such as animated GIF, and the like. According to the present embodiment, the storage unit 12 functions as a holding device which holds documents to be provided per providing unit. Further, according to an example of the present embodiment, the document original information may be generated in the providing-side apparatus 1 in response to operations by a user, or may be acquired through a network. According to the present embodiment, the document original information is stored in a predetermined server device (for example, a web server), and provided by the server device. The providing-side apparatus 1 may also serve as the server device.

Figure 2:
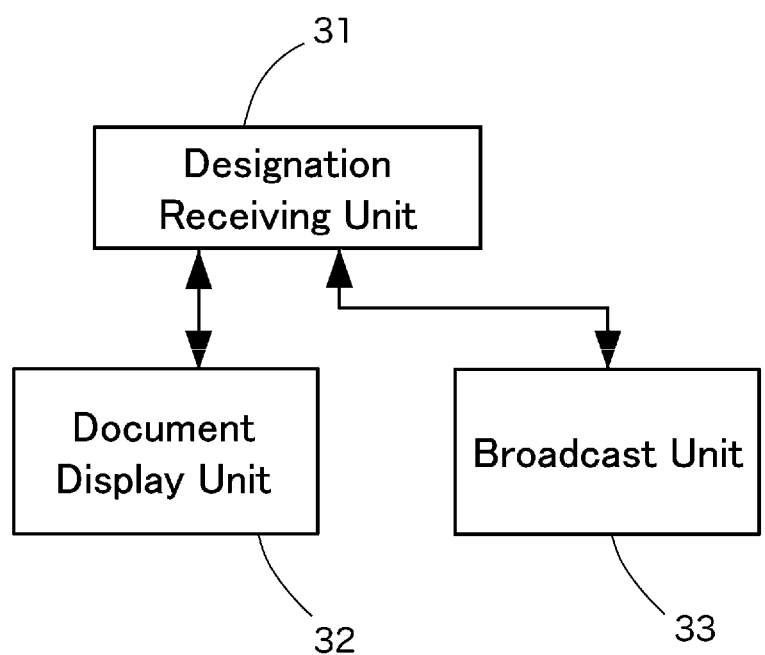
FIG. 2 is a functional block diagram showing an example of a providing-side apparatus according to an embodiment of the present disclosure.

According to the present embodiment, the control unit 11 of the providing-side apparatus 1 functions as a device which broadcasts information for specifying a designated document from among the stored documents. As shown in FIG. 2, the control unit 11 functionally comprises a designation receiving unit 31 which receives designation of a document, a document display unit 32 which displays the designated document, and a broadcast unit 33 which broadcasts information for specifying the designated document.

The designation receiving unit 31 displays a list of documents which can be displayed. When a user of the providing-side apparatus 1 operates the operation unit 13 to designate a document to be provided from the list, the designation receiving unit 31 outputs information which specifies the designated document. Here, the information for specifying the document may be, for example, a value calculated on the basis of the content information of the designated document, which may be a hash value (such as SHA-1, MD5, etc.) of the document content information. The document display unit 32 reads out, from the storage unit 12, the document specified by the information output from the designation receiving unit 31, and displays the read-out document on the display unit 14.

The broadcast unit 33 broadcasts (transmits as information which can be received by any receivable terminals, without specifying a destination), through the second communication unit 16, the document specifying information, which has been output from the designation receiving unit 31. According to an example of the present embodiment, the second communication unit 16 performs communication in accordance with Bluetooth standards. Here, the second communication unit 26 uses advertisement packets of a technology developed as BLE (Bluetooth Low Energy (Bluetooth is a registered trademark)), as broadcast signals. The method for the broadcast is not limited to the use of the BLE advertisement packets, but any signals capable of being transmitted/received without requiring processes for authentication or connection, can be used.

Figure 3:
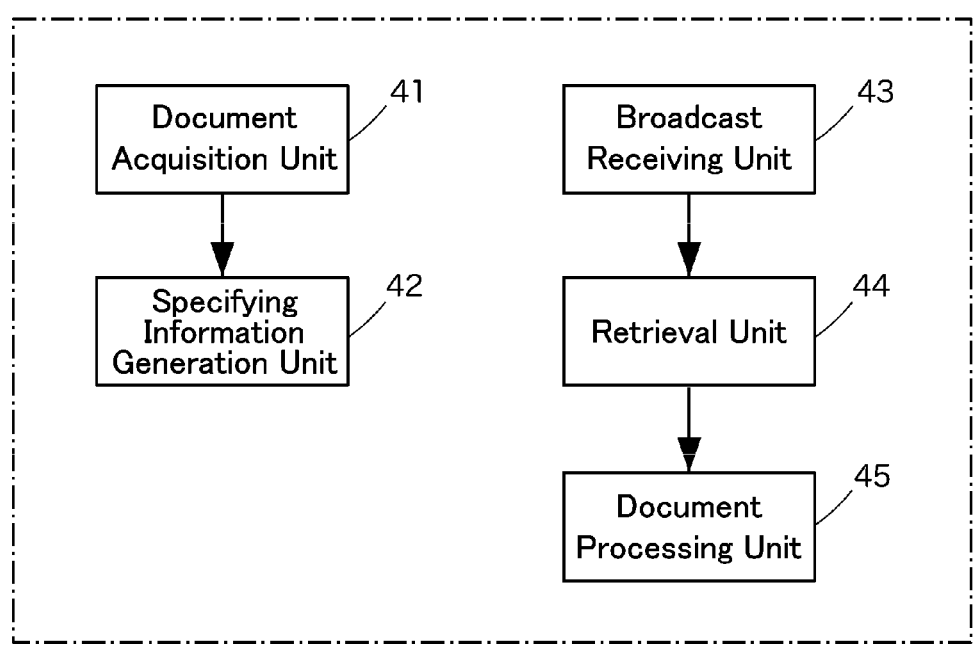
FIG. 3 is a functional block diagram showing an example of a display-side apparatus according to an embodiment of the present disclosure.

As exemplified in FIG. 3, the control unit 21 of the display-side apparatus 2 functionally comprises a document acquisition unit 41, a specifying information generation unit 42, a broadcast receiving unit 43, a retrieval unit 44, and a document processing unit 45.

In response to a user's operation of the display-side apparatus 2, the document acquisition unit 41 receives information which expresses a location where the document to be acquired is present (the information may be information expressing a location within a server device on the network, for example, information described by URL (Uniform Resource Locator)). The document acquisition unit 41 downloads document original information from the location specified by the received information (such as a server device), through the first communication unit 25, and stores the document original information in the storage unit 22. Here, the document original information to be downloaded may be information of a document in PDF format of Adobe Systems, Incorporated.

On the basis of each page information of the document original information acquired by the document acquisition unit 41, the specifying information generation unit 42 renders each page image expressed by the document original information into a bitmap image of a predetermined format, such as PNG having a predetermined size, etc. Here, the predetermined format is the same as the format of the document stored in the storage unit 12 of the providing-side apparatus 1. Further, on the basis of the bitmap image of each page obtained by the rendering, the specifying information generation unit 42 generates information which specifies the document. The generated document specifying information is the same as the document specifying information obtained by the providing-side apparatus 1.

Figure 4:
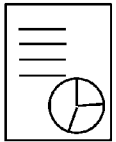
FIG. 4 is an explanatory view showing an example of holding a document in a document providing system according to an embodiment of the present disclosure.
Figure 4:
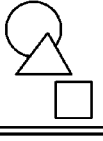

With respect to each of the rendered documents stored in the storage unit 22, the specifying information generation unit 42 records the document specifying information generated on the basis of each rendered document, in association therewith (FIG. 4).

The broadcast receiving unit 43 receives information broadcasted by the providing-side apparatus 1. According to the present embodiment, the providing-side apparatus 1 transmits information for specifying the document designated by the user, using the BLE advertisement packets. Then, the broadcast receiving unit 43 receives the document specifying information transmitted by the providing-side apparatus 1.

The retrieval unit 44 retrieves the document specified by the information received by the broadcast receiving unit 43, from the documents stored in the storage unit 22. Specifically, the retrieval unit 44 retrieves the document associated with the information received by the broadcast receiving unit 43, from the storage unit 22. If the document associated with the information received by the broadcast receiving unit 43 is not stored in the storage unit 22, the retrieval unit 44 outputs information expressing the retrieval result (retrieval failure) to the document processing unit 45. If the document associated with the information received by the broadcast receiving unit 43 is retrieved from the storage unit 22, the retrieval unit 44 outputs the retrieved document to the document processing unit 45.

The document processing unit 45 outputs the document output from the retrieval unit 44, to the display unit 24 to display the document thereon. At this time, if the document contains a moving image such as an animated GIF, the document processing unit 45 may output and display the moving image by playbacking the same. If the retrieval unit 44 outputs the information expressing the retrieval failure, the document processing unit 45 may output the information expressing the retrieval failure to display the same on the display unit 24, or may perform nothing.

The document providing system according to an example of the present embodiment has the above configuration, and operates as follows. In the following explanation, the display-side apparatus 2 is located within a range capable of receiving BLE advertisement packets transmitted by the providing-side apparatus 1 (within approximately 100 m from the position where the advertisement packets are emitted).

A user of the display-side apparatus 2 has downloaded, in advance, the document original information (for example, document information in PDF format) which is the original of the document, from the previously instructed URL (the URL may be transmitted by the providing-side apparatus 1, and then received, or may be described in an non-electronic form, such as a printed handout, and input by the user of the display-side apparatus 2). In the display-side apparatus 2, each page of the document is rendered into a bitmap image of a predetermined size, on the basis of each page information of the downloaded document original information. Further, the display-side apparatus 2 calculates a hash value with respect to the content of the each page's bitmap image obtained by the rendering, and records the calculated hash value, as the document specifying information, in association with the corresponding page document (bitmap image), in the storage unit 22.

On the other hand, a user of the providing-side apparatus 1 has obtained, in advance, a document to be provided, and document specifying information for the corresponding document. Specifically, the user has downloaded PDF-format document original information, which is the original of the document, and has obtained an image of each page of the document original information by rendering.

Figure 5:
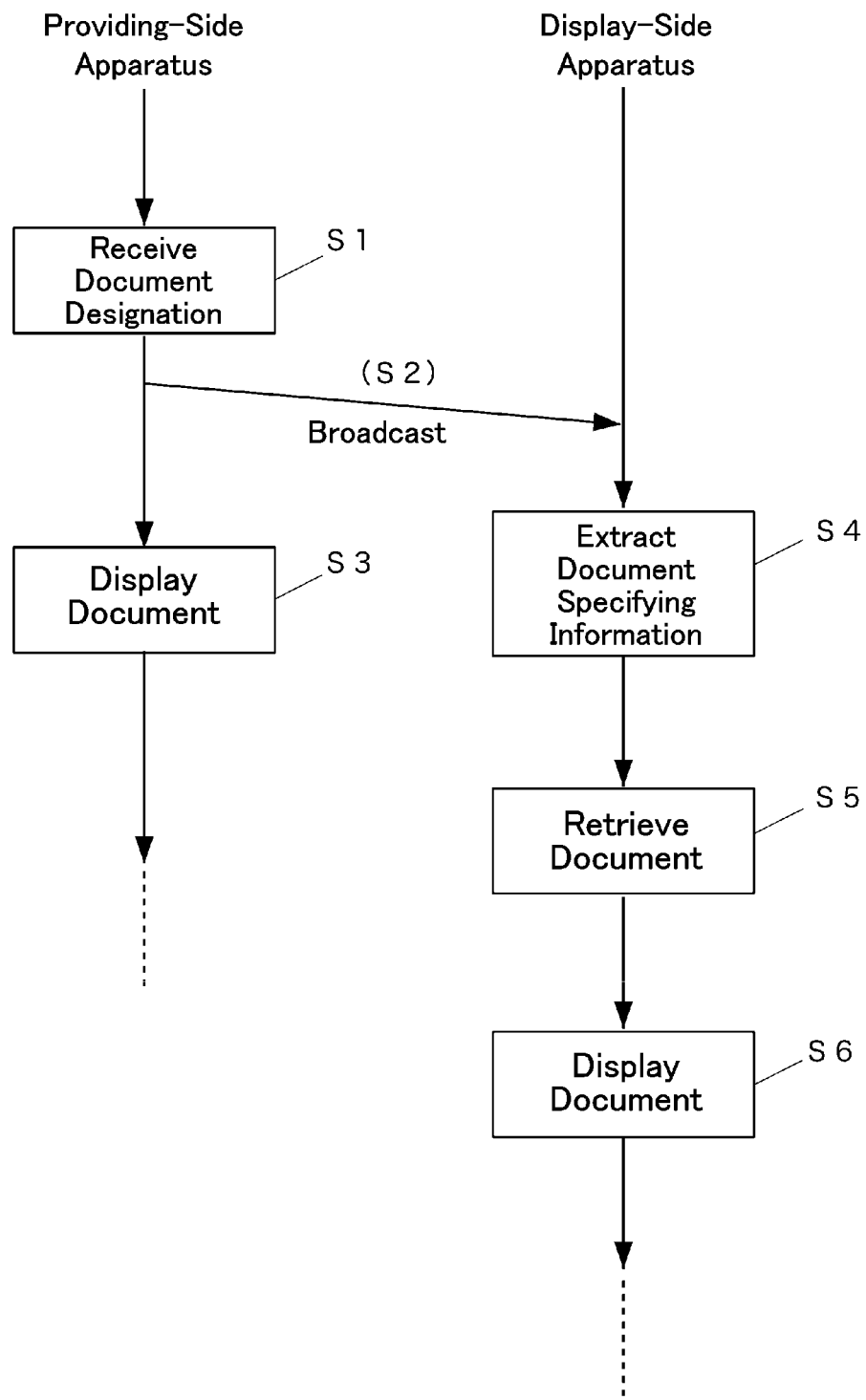
FIG. 5 is a flowchart showing an operation example of a document providing system according to an embodiment of the present disclosure.

Here, as exemplified in FIG. 5, when the user of the providing-side apparatus 1 operates to designate a document to be provided (S1), the providing-side apparatus 1 acquires information which specifies the designated document. Here, the providing-side apparatus 1 may acquire the document specifying information by calculation when the document to be provided is designated, or may calculate the document specifying information in advance for each of the documents stored in the storage unit 12 before the designation is performed.

After acquiring the information for specifying the document designated by the user, the providing-side apparatus 1 transmits the information by including the information in a BLE advertisement packet (S2). The advertisement packet includes a plurality of advertisement elements (ADk (k=1, 2, . . . )). Here, each advertisement element includes element length information (1 byte) at the head, element type information (AD Type), and content data (AD Data). According to the present embodiment, the element type has been determined previously, and the document specifying information is included as the content data. At this time, the providing-side apparatus 1 displays the designated document (S3).

The display-side apparatus 2 receives the advertisement packets transmitted by the providing-side apparatus 1. The display-side apparatus 2 extracts the document specifying information from the received advertisement packets (S4), and searches the storage unit 22 to retrieve the document specified by the extracted information (S5). When the document specified of the extracted information is found from the storage unit 22, the display-side apparatus 2 displays the document (S6).

Accordingly, when a user of the providing-side apparatus 1 designates a document, the same document is displayed on the display-side apparatus 2. If the document specified by the information transmitted by the providing-side apparatus 1 is not stored in the display-side apparatus 2, the designated document is not displayed on the display-side apparatus 2. Therefore, in the system according to the present embodiment, in order to prevent a document from being displayed on the side of a person who is not allowed to see the document, not providing the person with the document in advance, is sufficient. In addition, when the document specified by the received information is not present, the display-side apparatus 2 may display a notification representing the absence of the document. In this case, when the document is updated to become a new document, suggesting the update of the relevant document is possible.

Further, in the present example, the URL representing the acquisition source of the document original information is obtained by the display-side apparatus 2 through the input operation by the user. However, the present embodiment is not limited thereto. For example, the information representing the acquisition source of the document original information, such as a URL, etc., may be included in the advertisement packet and transmitted by the providing-side apparatus 1. In this case, the display-side apparatus 2 receives the URL, etc. broadcasted from the providing-side apparatus 1, and acquires the document original information using the received URL, etc.

Further, in the present example, the document original information is downloaded from a designated URL. Instead, however, according to the present embodiment, the providing-side apparatus 1 may transmit the document original information or the document itself (the document to be provided itself, which has been obtained by rendering the document original information) by including the same in the advertisement packet. In general, the size of the document original information is larger than the size of data which can be included in an advertisement packet. Therefore, in this case, the providing-side apparatus 1 divides the information to be transmitted (the document original information or the document itself) into a plurality of portions, and transmits each portion obtained by the division by including the portion in each advertisement packet.

When the information is divided as above, the display-side apparatus 2 generates the original information (the document original information or the document itself, before the division) on the basis of the divided information portions included in the received advertisement packets, and uses the generated information. Specifically, when the display-side apparatus 2 receives the document original information, the display-side apparatus 2 obtains the document by rendering the image of each page of the document original information. When the display-side apparatus 2 receives the document itself, the display-side apparatus 2 stores the document as is in the storage unit 22. Then, with respect each of the obtained or received documents, a hash value of each content is calculated, and the calculated hash value is recorded as the document specifying information in association with the corresponding page document, in the storage unit 22. In this case, the operations of the providing-side apparatus 1 and the display-side apparatus 2 thereafter are the same as those explained above with reference to FIG. 5.

Example where Instruction is Broadcasted

In the above explanation, the providing-side apparatus 1 broadcasts the document specifying information, and the display-side apparatus 2 receiving the broadcasted information, displays the document specified by the information. However, the present embodiment is not limited thereto. The providing-side apparatus 1 may broadcast the document specifying information together with the information expressing the content of the process performed to the document specified by the information (process instruction information) (by, for example, including the process instruction information in the advertisement packet).

Here, the process instruction information may be various type of information, such as an instruction to delete a document from the storage unit 22 (deletion instruction), an instruction to change a display type (specifically, an instruction to rotate, to enlarge/reduce the size, to zoom a portion, etc., in display), and the like. In an example where the providing-side apparatus 1 transmits such an instruction, the control unit 11 of the providing-side apparatus 1 displays a list of displayable documents, as an operation as the designation receiving unit 31.

When the user of the providing-side apparatus 1 operates the operation unit 13 to designate a document to be provided from the list, and to input process instruction information expressing the process to be performed for the document in the display-side apparatus 2, the designation receiving unit 31 outputs information for specifying the designated document, and the input process instruction information. Here, if the process instruction information is an instruction to enlarge/reduce the size, etc., the designation receiving unit 31 also receives, from the user, a parameter of the process, such as an enlargement/reduction rate, and outputs the parameter together, by including the parameter in the process instruction information. Then, the document display unit 32 reads out the document specified by the information output from the designation receiving unit 31, and displays the document on the display unit 14.

The broadcast unit 33 broadcasts the document specifying information and the process instruction information output from the designation receiving unit 31, through the second communication unit 16. In the present example, the method for the broadcast may also be a method using the BLE advertisement packets.

In the present example, the control unit 21 of the display-side apparatus 2 performs the same processes as the example explained above, with respect to the processes as the document acquisition unit 41 and the specifying information generation unit 42, but performs differently with respect to other processes. Namely, in the present example, the broadcast receiving unit 43 receives the document specifying information and the process instruction information transmitted from the providing-side apparatus 1.

Further, the retrieval unit 44 searches the documents stored in the storage unit 22 to locate a document specified by the information received by the broadcast receiving unit 43. Specifically, the retrieval unit 44 retrieves a document associated with the information received by the broadcast receiving unit 43, from the storage unit 22. If the document associated with the information received by the broadcast receiving unit 43 is not stored in the storage unit 22, the retrieval unit 44 outputs information expressing the result (retrieval failure) to the document processing unit 45.

When the document specified by the information received from the providing-side apparatus 1 is retrieved by the retrieval unit 44, the document processing unit 45 subjects the retrieved document to processes according to the process instruction information received from the providing-side apparatus 1. For example, if the process instruction information is an instruction to display the document, the document processing unit 45 outputs the document to the display unit 24 to display the document thereon. If the process instruction information is an instruction to delete the document, the document processing unit 45 deletes the document from the storage unit 22. If the process instruction information is an instruction to display the document after the size enlargement/reduction process (in this case, the parameter such as enlargement/reduction rate is also included in the process instruction information), the document processing unit 45 subjects the document retrieved by the retrieval unit 44 to the size enlargement/reduction process according to the designated parameter of the enlargement/reduction rate, and outputs the resulting document to the display unit 24 to display the document thereon. If the process instruction information is an instruction to zoom the document including the information expressing the display range as a parameter, the document processing unit 45 outputs a portion of the document corresponding to the display range designated by the parameter, to the display unit 24 to display the portion thereon. At this time, the display-side apparatus 2 may outputs the portion by enlarging/reducing the size of the portion, within a displayable range on the display unit 24. Further, if the document includes a video, etc., a plurality of static image frames, or a plurality of playback start points (such as chapter markers) in a moving image, the providing-side apparatus 1 may provide instructions for frame-by-frame playback of the static images, etc. (movement to the next frame, next playback start point, or the previous frame, previous playback start point), or movement to a designated frame or a designated playback start point, and the document processing unit 45 may perform processes such as frame-by-frame playback of the moving image, display of the designated static image frame, playback of the moving image from the designated playback start point, or the like.

In addition, when the retrieval unit 44 outputs information expressing the retrieval failure, the document processing unit 45 may outputs the information expressing the retrieval failure to the display unit 24 to display the information thereon, or may do nothing.

Providing Annotation

According to an example of the present embodiment, the process instruction information may express an instruction to display the document with an additional image, such as an annotation, etc., synthesized thereto. In this case, while the document display unit 32 is displaying the document designated by a user, the control unit 11 of the providing-side apparatus 1 receives the input of information for specifying an annotation, the information being information expressing an image to be included in the annotation (for example, information such as a character string, background color which should be displayed as annotation), and information regarding a position where the annotation is to be displayed.

Figure 6:
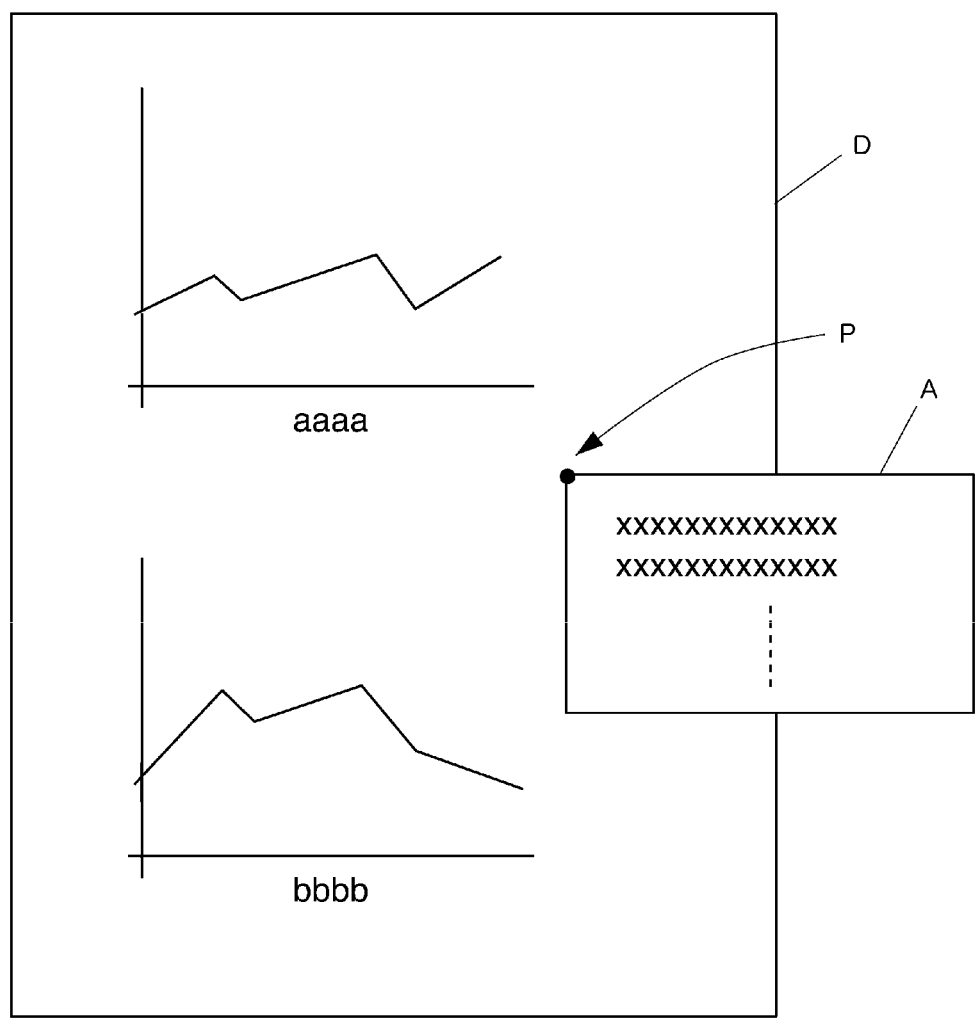
FIG. 6 is an explanatory view showing an example of displaying annotation information to be used in a document providing system according to an embodiment of the present disclosure.

The document display unit 32 generates an annotation image in accordance with the input information. As shown by the example in FIG. 6, the annotation image (A) is displayed to be superimposed on the document (D), and the annotation image (A) may be a character string which has been input within a rectangle painted with a background color. The document display unit 32 displays the generated annotation image at a display position input by the user (P in FIG. 6). Specifically, this position may be input as a point where a predetermined point determined in relation to the annotation should be located, the predetermined point may be a point where the diagonal lines of the rectangle (i.e., the annotation image), intersect, a point located within the rectangle (i.e., the annotation image), such as any one of the vertexes of the rectangle (or a point separated from the rectangle by a predetermined number of pixels), or the like. The document display unit 32 adjusts the display position of the annotation so that the predetermined point determined in relation to the annotation is located at the input position, and displays the generated annotation image to be superimposed on the document image. As for the method for the superimposition display, various widely known methods can be applied, such as the alpha blending, and thus, detailed explanation therefor is omitted here.

The broadcast unit 33 broadcasts the information for specifying the document displayed by the document display unit 32, the information input by the user and expressing the image which should be included by in the annotation, and a position at which the annotation should be displayed, through the second communication unit 16. In the present example, the method for the broadcast may also be a method using the BLE advertisement packets.

In the present example, as a process performed as the broadcast receiving unit 43, the control unit 21 of the display-side apparatus 2 receives the information for specifying the document transmitted by the providing-side apparatus 1, the information expressing the image to be included in the annotation, and the position at which the annotation should be displayed, and outputs what has been received to the document processing unit 45.

Also, the document processing unit 45 examines whether or not the currently displayed document is a document specified by the information input from the broadcast receiving unit 43. If the currently displayed document is not the document specified by the information input from the broadcast receiving unit 43, the document processing unit 45 performs nothing and terminates the process.

If the currently displayed document is the document specified by the information input from the broadcast receiving unit 43, the document processing unit 45 generates an annotation image, on the basis of the information expressing the image which should be included in the annotation, input from the broadcast receiving unit 43. The annotation image may be the same as that in the providing-side apparatus 1, such as an image displaying the character string, which has been input, within a rectangular painted with a background color, as exemplified in FIG. 6. The document processing unit 45 displays the generated annotation image at a display position input from the broadcast receiving unit 43. The method for displaying the annotation image is the same as the example of the display document display unit 32 in the providing-side apparatus 1, and thus, the explanation is not repeated.

Example Performing Authentication

Further, according to an example of the present embodiment, an authentication process may be performed so that the document is provided only to an authenticated user of the display-side apparatus 2. When authentication is performed, for example, the providing-side apparatus 1 has previously received the input of a password from the user, and when the document specifying information and the information such as a URL of the document original information are transmitted, password information may be transmitted together.

In this case, upon receiving the password information together with the document specifying information, etc., the display-side apparatus 2 examines whether or not the password which has been input by the user in advance matches the received password information. If the passwords are not identical, the display-side apparatus 2 does not perform the subsequent processes, and the document is not provided to the user. If the passwords are identical, the display-side apparatus 2 performs processes using the information received from the providing-side apparatus 1 (such as displaying the document specified by the received information, and the like).

The authentication method is not limited to the example using the password input by the user. For example, an authentication server may receive the input of position information (the information may be information acquired by the GPS (Global Positioning system), information for specifying a mobile phone base station for the current communication, an access point of a wireless LAN, etc.) from the providing-side apparatus 1 or the display-side apparatus 2 through the network, and issues and transmits a common password to the providing-side apparatus 1 or the display-side apparatus 2 having the position information within a predetermined range.

Specifically, the authentication server holds the received position information in association with the password transmitted to the transmission source of the position information, for a predetermined time (for example, for 10 minutes after the transmission of the password). Every time the authentication server receives position information, the authentication server compares the held position information (position information received from the destination to which the password was transmitted in the past), with the newly received position information, and searches the held position information to retrieve position information satisfying a condition that the difference between the position expressed by the retrieved position information and the position expressed by the newly received position information is within a predetermined range. If such position information is retrieved from the held position information, the authentication server transmits the password associated with the retrieved position information, to the transmission source of the newly received position information. If no position information satisfying the above condition is retrieved from the held position information, the authentication server issues a new password, and transmits the issued password to the transmission source of the newly received position information.

In this example, in response to a predetermined operation by a user, the control unit 11 of the providing-side apparatus 1 and the control unit 21 of the display-side apparatus 2 transmit position information to the authentication server, and then, acquire password information transmitted by the authentication server. Thereafter, the providing-side apparatus 1 transmits the password information received from the authentication server together with the document specifying information and the information such as the URL of the document original information.

In this case, the display-side apparatus 2 also holds the password information received from the authentication server. When the display-side apparatus 2 receives the password information together with the document specifying information, etc., from the providing-side apparatus 1, the display-side apparatus 2 examines whether or not the held password information is identical with the received password information. If they are not identical, the subsequent processes are not performed, and the document is not provided to the user. If they are identical, the process using the information received from the providing-side apparatus 1 (such as a process to display a document specified by the information) is performed.

Further, recently, a program to be executed by the control unit 21 of the display-side apparatus 2 may be installed by downloading the program from a program providing site which requires authentication of a user (such as, App Store of Apple, Inc.). In this case, user authentication information (user name, etc.) of the download source site may be held at the program side.

Thus, when the document specifying information and the information such as URL of the document original information, etc., are transmitted from the providing-side apparatus 1, the user authentication information the display-side apparatus 2 at which the transmitted information can be used (authentication information of the download source site) may be transmitted together. The authentication information may be previously input by the user, or may be received from the display-side apparatus 2 through the network.

In this example, when the display-side apparatus 2 receives the authentication information together with the document specifying information, etc., the display-side apparatus 2 examines whether or not the authentication information held at the program side is included in the received authentication information. If the authentication information held at the program side is not included in the received authentication information, the subsequent processes are not performed, and the document is not provided to the user. If the authentication information held at the program side is included in the received authentication information, the process using the information received from the providing-side apparatus 1 (such as a process to display the document specified by the information) is performed.

Modified Example

In the above explanation, the broadcast is performed for the communication between the second communication unit 16 of the providing-side apparatus 1 and the second communication unit 26 of the display-side apparatus 2. However, the broadcast may be used for the communication between the first communication unit 15 and the first communication unit 25 through the network. In this case, broadcast communication in wireless LAN, etc., is used for transmitting the document specifying information, etc., from the providing-side apparatus 1 to the display-side apparatus 2.

Further, the document specifying information is not limited to the above-described value based on the document content. Another example of the document specifying information may be, for example, a document file name or URL together with page information of the document original information, and the like.

Further, according to an example of the present embodiment, the display-side apparatus 2 does not obtain a bitmap image based on the document original information such as PDF, etc., but processes, i.e., displays, etc., the PDF or a file of the presentation software as is, as a document. In general, a file of a presentation software includes a sequentially arranged plurality of pieces of slide information, each piece of slide information including an information element such as a static image, a moving image, character string information, etc.

In this example, the display-side apparatus 2 receives, for example, information for specifying a file of a presentation software, as the document specifying information, from the providing-side apparatus 1, and acquires the file specified by the information by downloading the file, etc. Then, the acquired file is subjected to a process such as display, etc., as a document.

At this time, the providing-side apparatus 1 transmits by broadcasting, information expressing the content of the process to be performed for the document (process instruction information) (for example, by including the information in the above-mentioned advertisement packet). Namely, with respect to the slide information included in the presentation software file, i.e., the document, the providing-side apparatus 1 broadcasts an instruction to display the subsequent slide information (to display the next slide information in the sequence), an instruction to display slide information at a specific position (to display slide information located at a specific position in the sequence), and the like.

Then, in accordance with the instruction, the display-side apparatus 2 displays the specific piece of slide information specified by the instruction, among the pieces of slide information included in the presentation software file, i.e., the document.

Cache to Access Point

In the above explanation, the display-side apparatus 2 has previously downloaded the document original information (for example, document information in PDF format) from the URL of the previously indicated server device (as far as the document original information is ready to be provided, the downloading can be performed at any time before the receiving of information broadcasted from the providing-side apparatus 1). However, for example, if the first communication unit 25 of the display-side apparatus 2 is a Wi-Fi interface, the display-side apparatus 2 communicates with the server device on the network through a wireless LAN access point (hereinafter, simply referred to as an access point), and the access point can cache the document original information, etc., the communication can be more efficient by making the access point cache the document original information.

Figure 7:
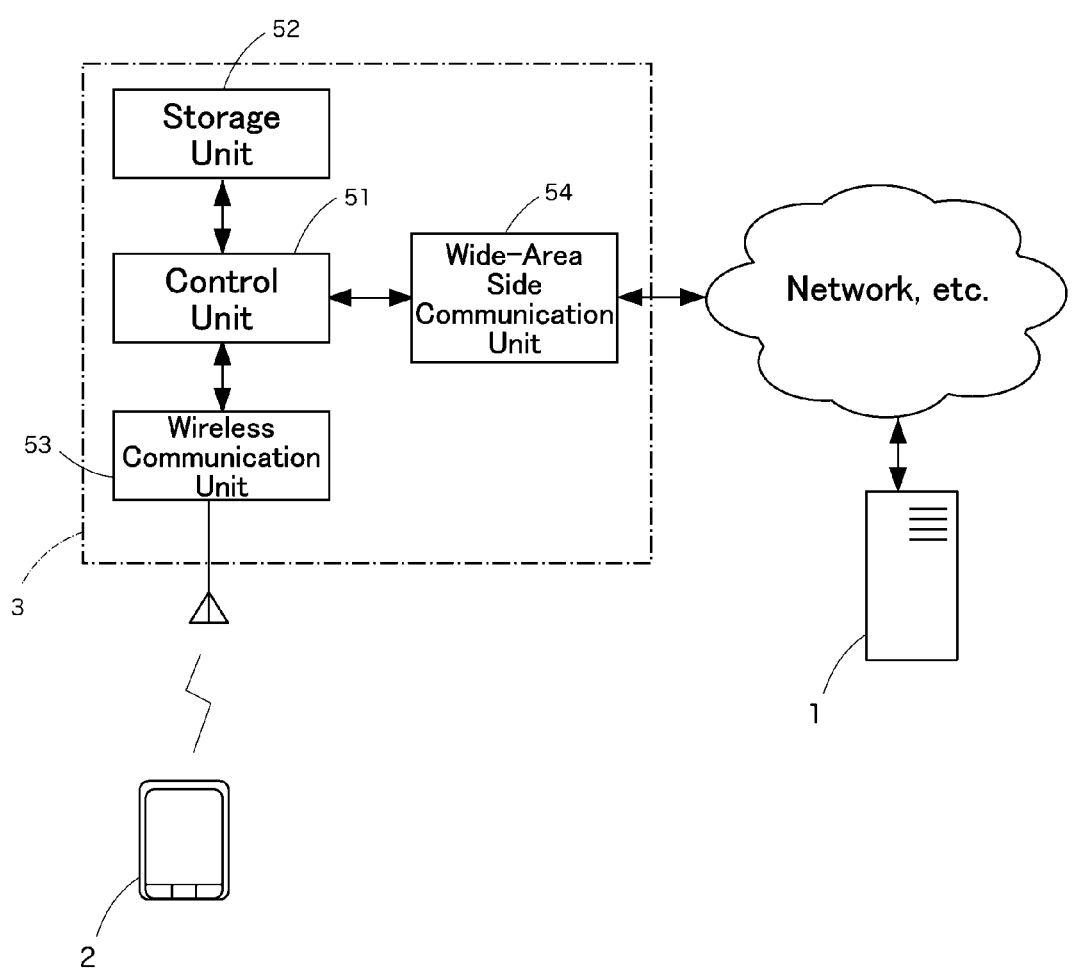
FIG. 7 is a block diagram showing a constitutional example of an access point used in a document providing system according to an embodiment of the present disclosure.

As exemplified in FIG. 7, such an access point 3 comprises a control unit 51, a storage unit 52, a wireless communication unit 53, and a wide-area side communication unit 54. The control unit 51 is a program controlled device such as a CPU, and operates in accordance with a program stored in the storage unit 52.

The control unit 51 operates to provide a function as an ordinary access point, i.e., intermediating information transmission/reception between the communication destination communicating through the wireless communication unit 53 and the communication destination connectable through the wide-area side communication unit 54. In addition, the control unit 51 operates as follows by receiving information (URL, etc.) expressing the storage place of the information to be cached, together with the information caching instruction, through the wireless communication unit 53 or the wide-area side communication unit 54. Namely, at this time, the control unit 51 acquires information to be cached, from the storage place expressed by the received information such as URL. Then, the control unit 51 stores the acquired information in association with the information expressing the storage place, such as the URL of the acquisition source of the information, in the storage unit 52.

When the control unit 51 receives, through the wireless communication unit 53, the information, etc., expressing the information storage place, such as a URL, together with a request for acquiring the information from the storage place specified by the information (acquisition request), the control unit 51 examines whether or not the information associated with the received information such as the URL is stored in the storage unit 52. If such information is not stored in the storage unit 52, the control unit 51 performs an ordinary operation to transmit the information such as URL and the information acquisition request, through the wide-area side communication unit 54. Thereafter, if these is a response to the acquisition request (if information is provided), the control unit 51 transmits the provided information to the source of the request, through the wireless communication unit 53.

If the information associated with the received information such as URL, is stored in the storage unit 52, the control unit 51 reads out the relevant information stored in the storage unit 52, and transmits the read-out information to the source of the request, through the wireless communication unit 53.

The storage unit 52 is a memory device, etc. In this example of the present embodiment, the storage unit 52 may include a disk device such as an SSD (Solid State Drive), etc. The storage unit 52 stores a program to be executed by the control unit 51. The storage unit 52 also functions as a work memory of the control unit 51.

The wireless communication unit 53 is a Wi-Fi interface, etc., which wirelessly transmits/receives information to/from a terminal within a predetermined communicable range, for example, the display-side apparatus 2, etc., of the present embodiment. The wide-area side communication unit 54 is connected to a communication network wider than the communicable range of the wireless communication unit 53, for example, a wired network (including a local area network within an organization), and transmits/receives information to/from the server device on the wired network.

When such an access point 3 is used, the user of the providing-side apparatus 1 stores the document original information in the server device, and transmits URL information expressing the storage place, and an instruction to cache the information, to the access point 3, through wired or wireless communication. Thereby, the document original information is associated with the URL of the server device, and stored in the access point 3. When a request for acquiring the document original information from the relevant URL is transmitted from the display-side apparatus 2 to the access point 3, the access point 3 provides the display-side apparatus 2 with the document original information stored (cached) in the access point 3.

Example for Predicting the Movement of Display-Side Apparatus

The aforementioned example of performing caching at the access point 3 is effective when the access point 3 communicating with the display-side apparatus 2 is previously known (such as a case wherein class schedule and a classroom to be used are determined), as in a school classroom, a lecture hall, etc. However, even within an organization such as a school, for example, if the user of the display-side apparatus 2 may move from one classroom to another classroom, or move within a campus. In this case, even if a large number of access points 3 capable of caching information are arranged, the access point 3 communicating with the display-side apparatus 2 is changed, and thus, the user of the providing-side apparatus 1 has to determine which access point 3 should cache the information.

Therefore, according to an example of the present embodiment, the providing-side apparatus 1 operates as a server device (web server) which provides the document original information. In this case, the display-side apparatus 2 is provided with the URL of the web server of the providing-side apparatus 1 as the URL representing the storage place of the document original information. In response to the request for the document original information from the display-side apparatus 2 through the access point 3, the providing-side apparatus 1 acquires unique information of the display-side apparatus 2, i.e., the request source (for example, acquires the MAC address of the display-side apparatus 2 using ARP, etc.), associates the acquired unique information with the information specifying the access point 3 communicating with the display-side apparatus 2 (for example, the wired-side IP address of the access point 3, etc.), and accumulates and stores the associated information as request source information.

By performing these processes, information for specifying the access point 3 communicating with the display-side apparatus 2 is accumulated, as time passes. The providing-side apparatus 1 refers to the information for specifying the access point 3 included in the request source information, and counts the number of appearances of the information specifying the same access point 3. Thereby, with respect to each access point 3, the number of times that the document original information is requested through the relevant access point 3 is counted, such that the number of times of the request reception through the access point 3*a* is Na, the number of times of the request reception through the access point 3*b* is Nb, and so on.

The providing-side apparatus 1 accumulates and stores the information specifying the access point 3 (for example, the wired-side IP address of the access point 3, etc.) for which the number of times of request reception exceeds a predetermined threshold number, in a cache database.

Thereafter, every time that the user designates a new document original information as information to be provided by the server device, the providing-side apparatus 1 makes the relevant document original information to be provided be cached by the access point 3 (or a plurality of access points 3) specified by the information recorded in the cache database.

Accordingly, on the basis of the past use results, the access point 3 which will communicate with the display-side apparatus 2 is predicted, and caching is performed by the predicted access point 3. Thereby, the determination as to where the document original information should be cached, can be supported.

Example of Moving with Display-Side Apparatus

The access point 3 according to another example of the present embodiment may be provided with a moving device (moving function unit) which is not shown in the drawings. Specifically, the moving function unit may include tires moving on the ground and a motor driving the same, such as a radio-controlled car. The moving function unit may be provided with a rotor wing and move while floating in the air, such as a radio-controlled helicopter.

The wireless communication unit 53 of the access point 3 according to this example of the present embodiment is made to be capable of detecting the emission directions of the wireless signals from the communication destination, i.e., the display-side apparatus 2, such as an array antenna, etc. Further, in the access point 3 according to this example of the present embodiment, the wide-area side communication unit 54 is, for example, an interface communicating through a mobile phone communication network, that is, a wireless communication device having a wider communication range than the wireless communication unit 53.

When the wireless communication unit 53 detects the emission direction of the wireless signal from the communication destination, the control unit 51 acquires the information of the relevant direction, and controls the moving function unit to move in the direction specified by the information.

If communication is performed with a plurality of communication destinations, the control unit 51 may control the moving function unit to move in the direction where a larger number of communication destinations are present, or may select one communication destination as a target and control the moving function unit to move in the direction of the target. Here, the selection of the target may be performed to select a communication destination which has requested the cached information (moving function unit may be controlled to move in the direction where a largest number of communication destinations which have requested the cached information are present).

According to this example of the present embodiment, the access point 3 moves toward the communication destination side, and thus, even if the user holding the display-side apparatus 2 moves, the communication with the access point 3 can be maintained. Thus, when the information cached in the access point 3 is requested, the information can be received comparatively stably.

According to the present embodiment, complicate setting is not required at the time of participating a meeting, and having capability of receiving broadcasted information is enough. Therefore, the usability can be increased.

The preceding description has been presented only to illustrate and describe exemplary embodiments of the present document providing system, providing-side apparatus, and display-side apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A document providing system comprising:
a providing-side apparatus; and
a display-side apparatus,
wherein the providing-side apparatus comprises a holding device which holds documents, each document consisting of one or more pages, and a broadcast device which broadcasts document specifying information for specifying a document designated from among the held documents, and the document specifying information is a value calculated on the basis of a predetermined sized rendered bitmap image of each page of the document specified thereby, and
the display-side apparatus comprises a control unit which renders each page of each of documents obtained in advance, into a bitmap image having said predetermined size so as to be held in a storage unit of the display-side apparatus, receives the broadcasted document specifying information from the providing-side apparatus, retrieves a document by specifying a bitmap image from the bitmap images held in the storage unit of the display-side apparatus so that document specifying information calculated on the basis of the specified bitmap image is the same as the received document specifying information, and outputs the retrieved document to a display device which displays the retrieved document.

2. A providing-side apparatus capable of transmitting information to a display-side apparatus, in which the display-side apparatus obtains documents in advance, and renders each page of each of the obtained documents into a bitmap image so as to be held in a storage unit of the display-side apparatus, comprising:

a storage unit which holds documents, a broadcast device which broadcasts document specifying information for specifying a document designated from among the held documents so that the display-side apparatus receives the broadcasted document specifying information from the providing-side apparatus, retrieves a document specified by the received document specifying information from among the documents held in the storage unit of the display-side apparatus, and outputs the retrieved document to a display device which displays the retrieved document, and the document specifying information is a value calculated on the basis of a predetermined sized rendered bitmap image of each page of the document specified thereby.

3. A display-side apparatus communicably connected to a providing-side apparatus, comprising:

a control unit which renders each page of each of documents obtained in advance, into a bitmap image so as to be held in a storage unit, receives document specifying information broadcasted by the providing-side apparatus, retrieves a document by specifying a bitmap image from the bitmap images held in the storage unit of the display-side apparatus so that document specifying information calculated on the basis of the specified bitmap image is the same as the received document specifying information, and outputs the retrieved document to a display device which displays the retrieved document.

* * * * *